(12) United States Patent
James et al.

(10) Patent No.: US 8,357,413 B2
(45) Date of Patent: Jan. 22, 2013

(54) PROCESS FOR THE DISINFECTION AND/OR PRESERVATION OF HARVESTED PLANT MATERIAL

(75) Inventors: Alun Pryce James, Blundellsands (GB); Madeline French, Norton (GB); Alan Sayle, Gisburn (GB); Peter King, Cross Lane (GB)

(73) Assignee: Solvay (Societe Anonyme), Brussels (BE)

( * ) Notice: Subject to any disclaimer, the term of this patent is extended or adjusted under 35 U.S.C. 154(b) by 895 days.

(21) Appl. No.: 10/584,321

(22) PCT Filed: Dec. 22, 2004

(86) PCT No.: PCT/EP2004/053678
§ 371 (c)(1),
(2), (4) Date: Aug. 2, 2007

(87) PCT Pub. No.: WO2005/063043
PCT Pub. Date: Jul. 14, 2005

(65) Prior Publication Data
US 2007/0281060 A1    Dec. 6, 2007

Related U.S. Application Data

(60) Provisional application No. 60/552,740, filed on Mar. 15, 2004.

(30) Foreign Application Priority Data

Dec. 29, 2003 (EP) .................................... 03258227

(51) Int. Cl.
*A23B 9/26* (2006.01)
*A23K 3/03* (2006.01)
*A23L 3/3508* (2006.01)

(52) U.S. Cl. ......... 426/335; 426/321; 426/661; 514/594

(58) Field of Classification Search .................. 426/335, 426/661, 321; 514/594
See application file for complete search history.

(56) References Cited

U.S. PATENT DOCUMENTS

| | | | | |
|---|---|---|---|---|
| 3,531,294 A * | 9/1970 | Glabau | ........................... | 426/21 |
| 3,784,699 A * | 1/1974 | Nakanishi | ..................... | 514/159 |
| 3,792,177 A | 2/1974 | Nakatani | | |
| 5,545,374 A * | 8/1996 | French et al. | ................... | 422/28 |
| 5,641,530 A * | 6/1997 | Chen | ............................. | 426/532 |
| 6,207,108 B1* | 3/2001 | Carr et al. | ........................ | 422/28 |
| 6,295,759 B1* | 10/2001 | Malone et al. | ................ | 47/62 R |
| 2001/0044470 A1* | 11/2001 | Sembo et al. | ................. | 514/594 |
| 2002/0168422 A1* | 11/2002 | Hei et al. | ....................... | 424/661 |
| 2002/0169149 A1* | 11/2002 | Koenig et al. | ................ | 514/143 |
| 2005/0048176 A1* | 3/2005 | McNeff et al. | ................ | 426/335 |

FOREIGN PATENT DOCUMENTS

| | | |
|---|---|---|
| DE | 648 908 | 8/1937 |
| EP | 0 054 995 | 6/1982 |
| EP | 0 335 242 | 10/1989 |
| EP | 335242 A * | 10/1989 |
| SU | 242661 | 4/1969 |
| SU | 686717 | 9/1979 |
| WO | 94/06294 | 3/1994 |
| WO | WO 9406294 A1 * | 3/1994 |
| WO | 95/34537 | 12/1995 |
| WO | 98/28267 | 7/1998 |
| WO | 99/44444 | 9/1999 |
| WO | WO 9944444 A1 * | 9/1999 |
| WO | 99/67213 | 12/1999 |

OTHER PUBLICATIONS

Rossmoore. Ch. 11.5, p. 320, Handbook of Biocide and Preservative Use, Springer, 1995.*
PERICIDE™ EF MSDS No. SPCEF0000; Published Dec. 10, 2001.*
Diouri, Mohammed, "Treatment of low quality forages by hydrogen peroxide and (or) anhydrous ammonia and their utilization in ruminant nutrition", Univ. Microfilms Int., order No. DA9316762 From: Diss. Abstr. Int., vol. 54, No. 2, p. 559, 1993.
Streeter, C. L. et al., "Effect of Treatment of Wheat Straw with Ammonia and Peracetic Acid on Digestibility in Vitro and Cell Wall Composition", Animal Feed Science and Technology, vol. 7, No. 4, pp. 325-329, 1982.

* cited by examiner

*Primary Examiner* — Brent O'Hern
(74) *Attorney, Agent, or Firm* — Oblon, Spivak, McClelland, Maier & Neustadt, L.L.P.

(57) ABSTRACT

Process for the disinfection and/or preservation of harvested plant material by contacting the harvested plant material with a liquid composition containing at least one peroxygen compound and at least one preservative.

15 Claims, No Drawings

PROCESS FOR THE DISINFECTION AND/OR PRESERVATION OF HARVESTED PLANT MATERIAL

This application is a 371 of PCT/EP04/53678, filed Dec. 22, 2004, and claims benefit of U.S. provisional application Ser. No. 60/552,740, filed Mar. 15, 2004.

The present invention is related to a process for the disinfection and/or preservation of harvested plant material such as grass forage used as animal feed.

Forage is generally used as animal feed particularly for cattle and horses. It consists for instance of harvested grasses, cereals, legumes and other plant material. In most cases, it is harvested several times per year during the growing season and stored for use as animal feed for winter when fresh food is not available. Forage is often stored in silos. During storage, micro-organisms may be active in the silo. These micro-organisms can use the forage as nutrients breaking it down to other products. If this micro-organism activity takes place under anaerobic or low oxygen conditions fermentation can occur, converting the nutrients particularly sugars in the forage to organic acids. Eventually the build-up of organic acids and the consequent reduction in pH of the forage can itself reduce or stop the anaerobic micro-organism activity. In this way the forage becomes silage (fermented forage). This micro-organism activity therefore is self-limiting and has a preservative effect on the animal feed. However, conversion of the sugars to acids reduces the nutritional quality of the resulting silage to the animals for which it is intended. This is particularly the case for cattle who have a ruminative digestive system which relies significantly on internal micro-organism activity. Clearly if a proportion of the sugar nutrients in the animal feed are already fermented to acids then the ruminative digestion and therefore the nutritional value to the cattle is reduced. In addition fermentation and acidification of the forage influences the desirability of the forage to the receiving animals eg. cattle and consequent feed conversion rates. High levels of butyric acid in particular are undesirable.

Once the forage starts to be taken from storage for use as animal feed, surfaces of the forage become exposed to air and increased oxygen levels. This can allow growth of aerobic micro-organisms such as bacteria, yeasts and moulds which can cause a deterioration in the nutritional quality of the forage and to its acceptability to cattle.

Therefore it is important to have a forage treatment which disinfects the forage to reduce initial contamination during harvest and also protects the forage from subsequent infection and growth of micro-organisms, both aerobic and anaerobic throughout the storage period, including the susceptible period when the forage storage area is opened to the air to allow its use for feed.

Forage treatments using formic acid or its salts are commonly used. Another example of known treatment is disclosed in the patent application EP 054995 in which calcium peroxide is used to treat fodder. In Kerley M S et al, Science, 230 (4727), p. 820-2 (1985), a hydrogen peroxide system is used on wheatstraw, corncobs and cornstalks. In the abstract CAS 120:132757 of the reference Diouri M., Dissertation, 54 (2), p. 559 (1993), hydrogen peroxide is used in combination with ammonia to treat forage.

The purpose of the present invention resides in providing a new method for the disinfection and/or preservation of harvested plant material which reduces micro-organisms activity, supplies oxygen and reduces anaerobic fermentation, thereby maintaining a satisfactory nutritional quality of the harvested plant material as animal feed. A further object of the present invention is to maintain a sufficient desirability or acceptability to the receiving animals, when the harvested plant material is used as animal feed. Another object of the present invention is to reduce initial contamination during harvest but also to protect the harvested forage from subsequent infection and growth of micro-organisms during storage.

To this end, the present invention is related to a process for the disinfection and/or preservation of harvested plant material by contacting the harvested plant material with a liquid composition containing at least one peroxygen compound and at least one preservative (such as for instance an organic acid or a salt thereof).

One of the essential features of the present invention is to combine a peroxygen compound with a preservative (such as for instance an organic acid or salt). This new combination leads indeed to several benefits such as the animal preference for eating plant material treated with this combination compared with classical products such as formic acid. Another benefit resides in improved milk yield from cattle eating plant material treated by the process of the present invention. Still another benefit resides in the reduction of fermentation of the plant material and therefore in a higher nutritional value such as higher sugar content. Further benefits are:

Control of micro-organism activity through disinfection and contribution of oxygen thereby reducing anaerobic fermentation, Maintenance of high sugar content of the plant material thus achieving better digestion and nutritional quality to receiving animals particularly ruminants and also better appearance of the plant material, Preservation to prevent microbial spoilage on opening plant material storage silo or clamp to use for feeding, resulting in exposure of plant material surfaces to oxygen to give aerobic conditions.

The term "preservative" means a chemical used to prevent biologic deterioration of materials. This typically necessitates persistence of the chemical in the material to be protected to provide ongoing biostatic activity.

The term "harvested plant material" denotes a plant material which has been cut from its cultivation site and which is left on the cultivation site or which is being or has been transported into a storage site such as a silo or another dedicated place in a farm. The cutting can be done by any appropriate machine such as mower, forage harvester or combine harvester, or manually using scythe or shears. The treatment can be done on the cut plant material while it is left on the cultivation site. Alternatively, the treatment can be done during transport from the cultivation site to the storage site. In still another variant, the treatment can be done during loading of the cut plant material in the storage equipment. Finally, the treatment can also be done during storage.

The plant material treated by the process of the present invention can be grass e.g. rye grass, Timothy grass, Fescues grass etc.; cereals e.g. maize, wheat, barley, triticale, rye, oats etc.; legumes e.g. peas, clovers, lupins; and seeds e.g. sunflower seeds. The process of the present invention is advantageously applied to plant materials which are harvested and stored to feed animals when fresh food is not available, especially in the winter. Typical examples of such animal feed are grass, cereals and legumes. Particularly good results are obtained with grass, also called grass forage or fodder. In most cases, the plant material treated by the process of the present invention is animal feed chosen from harvested grass, cereals, maize, wheat, legumes and mixtures thereof.

The process of the present invention consists in contacting the harvested plant material with a liquid composition. This contacting can be done by any appropriate way that allows a maximum contact of the liquid composition with the cut pieces of the plant material. It can for instance be done by spraying the liquid composition on the harvested plant material or by simply pouring the liquid composition onto the harvested plant material. It is also possible, when a large volume of harvested plant material is stored to gather first a small volume of harvested plant material, contact the upper surface of this volume with the liquid composition, add an additional volume of harvested material on top, contact the upper surface of this additional volume with the liquid composition, and so on, until the total volume is reached.

The liquid composition used in the process of the present invention can be chosen from aqueous and non aqueous solutions in which the peroxygen compound and the preservative (such as for instance organic acid or salt) are both dissolved. It can also be chosen from aqueous and non aqueous suspensions in which the peroxygen compound and/or the preservative (for instance the organic acid or salt) and/or another additive is present in the form of solid particles. Aqueous solutions are preferred.

The peroxygen compound used in the process of the present invention can be hydrogen peroxide or any precursor which leads to the formation of hydrogen peroxide when dissolved or suspended in the liquid composition. Examples of such precursors can be organic peracids, ester peracids, persalts, metallic peroxides or mixtures thereof.

Organic peracids can be chosen from those containing from 1 to 20 carbon atoms, in particular from 1 to 10 carbon atoms, and more particularly from 1 to 6 carbon atoms. They can be for instance performic acid, peracetic acid, peroctanoic acid, and mixtures thereof.

Ester peracids can be chosen from those disclosed in the patent applications WO 95/34537, WO 98/28267 and WO 99/67213. They usually have the general chemical formula

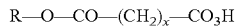

where R represents an alkyl group having from 1 to 6, in particular from 1 to 4, carbon atoms and x is from 1 to 4. The alkyl group can be linear or branched. Examples of suitable alkyl groups are n- or isopropyl, and n-, iso- or tertiary butyl. Preferably R is a methyl group. In many cases, x is 2, 3 or 4. In a particular embodiment, the liquid composition used in the process of the present invention comprises a mixture of ester peracids where x is 2, 3 and 4, i.e. a mixture of the monoesters of peradipic, perglutaric and persuccinic acids. In a particularly preferred embodiment, the major fraction of the ester peracids present in the liquid composition has x equal to 3. The most preferred ester peracids are the mixtures comprising monomethylesters of peradipic, perglutaric and persuccinic acids.

Persalts can be chosen from sodium perborate monohydrate, sodium perborate tetrahydrate, sodium percarbonate, sodium persulphate and mixtures thereof. Sodium percarbonate is especially preferred.

Metallic peroxides can be chosen from calcium peroxide, magnesium peroxide, zinc peroxide and mixtures thereof.

The most preferred peroxygen compounds are hydrogen peroxide, peracetic acid, and mixtures comprising monomethylesters of peradipic, perglutaric and persuccinic acids.

The preservative used in the process of the present invention can be chosen from, but is not limited to, the following: sodium phosphates, sucrose, sulphites, sodium nitrite, sodium chloride, propane-1,2-diol, formaldehyde, acetaldehyde. Preferably, the preservative is an organic acid or a salt thereof. The organic acid can be chosen from organic products having at least one —COOH group. They contain generally at least 2 carbon atoms, in particular at least 3 and in some cases at least 6 carbon atoms. They can contain up to 20 carbon atoms, especially up to 16 carbon atoms, in many cases up to 12 carbon atoms. Typical examples of suitable organic acids are acetic, octanoic, benzoic, parahydroxybenzoic, sorbic, ascorbic, citric, lactic, malic, fumaric, tartaric, propionic, succinic acid, ester acids and their salts, or mixtures thereof. Benzoic acid gives good results. In some cases, it is preferred that, when the peroxygen compound is hydrogen peroxide, the organic acid is different from formic acid. Furthermore, when the peroxygen compound is peracetic acid, it is possible that the liquid composition does not only contain acetic acid as an organic acid but in addition also another organic acid.

The salt of an organic acid can be any salt of the above-described organic acids. Sodium, potassium and calcium salts are suitable. Sodium benzoate gives particularly good results. In a particularly advantageous embodiment of the present invention, the peroxygen compound is hydrogen peroxide and the organic acid or salt is sodium benzoate.

In the process according to the present invention, the liquid composition contains generally an amount of peroxygen compound of at least 0.5% wt, in particular at least 1% wt, in most cases at least 5% wt. The amount of peroxygen compound is usually at most 60% wt, especially at most 50% wt, very often of at most 40% wt. When the peroxygen compound is hydrogen peroxide, good results are obtained with $H_2O_2$ amounts of from 5 to 60% wt, typical $H_2O_2$ amounts being about 18% wt, about 20% wt and about 35% wt. When the peroxygen compound is peracetic acid, good results are obtained with amounts of from 0.5 top 40% wt, typical amounts being about 1% wt and about 5% wt. In general, satisfactory results can be obtained with an amount of peroxygen compound of from 5 to 60% wt.

In the process according to the present invention, the liquid composition contains generally an amount of preservative of at least 5% wt, in particular at least 7% wt, in most cases at least 10% wt. The amount of preservative is usually at most 25% wt, especially at most 23% wt, most likely at most 20% wt. Good results are obtained with amounts of preservative of from 5 to 25% wt.

In the particularly advantageous embodiment of the present invention, in which hydrogen peroxide and sodium benzoate are used, their respective amounts in the liquid composition are preferably from 15 to 35% wt of hydrogen peroxide and from 10 to 20% wt of sodium benzoate.

In another embodiment of the present invention the liquid composition is an aqueous solution containing peracetic acid, acetic acid and hydrogen peroxide optionally in combination with an organic acid different from acetic acid. In this other embodiment, the amount of peracetic acid in the liquid composition is generally from 0.5 to 40% wt of peracetic acid (in particular from 1 to 10% wt), from 0.1 to 30% wt of hydrogen peroxide (especially from 5 to 25% wt) and from 1 to 60% wt of acetic acid (in some cases from 20 to 55% wt). In this other embodiment it is recommended to use amounts of peracetic acid and acetic acid so that the molar ratio of acetic acid to peracetic acid is high. For instance this molar ratio can be at least 1, in particular at least 5, values of at least 10 being most common. This molar ratio is usually at most 200, especially at most 100, and very often at most 50.

In the process of the present invention, the amounts of peroxygen compound and organic acid or salt are in general such that the molar ratio peroxygen compound to organic acid or salt is at least 0,05, in particular at least 0,1 ratios of at least 0,2 being preferred. This weight ratio can be up to 20, especially up to 10 and in most cases up to 5.

In the process of the present invention, the liquid composition is used in an amount of at least 0.5 l per tonne of plant material, especially at least 0.8 and in most cases at least 1 l per tonne of plant material. The amount of liquid composition is usually at most 10 l per tonne of plant material, more particularly at most 5 and in many cases at most 3 l per tonne of plant material. Good results are obtained with amounts of liquid compositions of from 0.5 to 10 l per tonne of plant material, and especially from 1 to 3 l per tonne of plant material.

In the process of the present invention, it is recommended to use acidic liquid compositions. The pH of the liquid composition is therefore generally at least 1, in particular at least 2 and in some cases at least 4. The pH can be up to 7, for instance up to 6.5 and very often up to 6. Good results are obtained when the liquid composition has a pH of from 1 to 7.

The liquid composition used in the process of the present invention can in addition contain other products such as peroxygen stabilizers. Suitable stabilizers include hydroxyl substituted aromatic carboxylic acids and ester derivatives thereof, particularly phenol carboxylic acids such as p-hydroxybenzoic acid and ester derivatives such as methyl or ethyl esters. They also include organic polyphosphonic sequestrants such as ethylidene diphosphonic acid, and aminoploymethylenephosphonic acids, pyridine carboxylic acids especially dipicolinic acid and mixtures thereof. In addition inorganic stabilizers may be used, for example, colloidal tin. They also include mineral acids such as sulphuric or nitric acids. These additional products are usually present in an amount from 0.02 to 20% wt. and in many instances from 0.1 to 10% wt.

Having described the invention in general terms, specific embodiments thereof will now be illustrated by way of example only.

EXAMPLE 1

50 tonnes perennial rye grass was cut and treated by spray application during cutting. The liquid composition consisted of 17% w/w hydrogen peroxide and 15% w/w sodium benzoate. This was applied at 3 liters liquid composition per tonne of fresh grass. A control of untreated grass was used as a comparison. The 50 tonnes grass forages were stored in a covered clamp under farm conditions for a period up to 12 weeks. A wide range of chemical and microbiological analyses of triplicate samples from the core of the clamp were conducted periodically during the storage period. Selected analyses are shown in Table 1. Analyses 6-9 in Table 1 demonstrate the reduced fermentation of the grass treated with the hydrogen peroxide formulation compared to the control with higher levels of unfermented residual sugars and lower fermentation levels of fermentation products.

TABLE 1

| Analysis of stored grass after 12 weeks | Hydrogen Peroxide/ Sodium Benzoate formulation | Control |
| --- | --- | --- |
| 1. Dry Matter (% w/w) | 45.3 | 42.4 |
| 2. Crude Protein (%)* | 12.0 | 12.2 |
| 3. Ash (%)* | 8.2 | 8.0 |
| 4. pH | 4.5 | 4.2 |
| 5. Ammonia - Nitrogen (%)* | 1.0 | 1.0 |
| 6. Residual Sugar (%)* | 12.4 | 7.8 |
| 7. Ethanol (%)* | 0.3 | 0.5 |

TABLE 1-continued

| Analysis of stored grass after 12 weeks | Hydrogen Peroxide/ Sodium Benzoate formulation | Control |
| --- | --- | --- |
| 8. Acetic Acid (%)* | <0.1 | 1.7 |
| 9. Total Volatile Fatty Acids (%)* | <0.1 | 1.7 |

*percentages are on a dry matter basis

EXAMPLE 2

As Example 1 but the liquid composition applied to the grass consisted of a peracetic acid formulation with a peracetic acid content of 1.1% w/w, a hydrogen peroxide content of 0.5% and an acetic acid to peracetic acid molar ratio of 1:0.07. The results after 8 weeks storage are shown in Table 2. Analyses 6-10 in Table 2 demonstrate the reduced fermentation of the grass treated with the peracetic acid formulation compared to the control with higher levels of unfermented residual sugars and lower levels of fermentation products.

TABLE 2

| Analysis of stored grass after 8 weeks | Peracetic Acid formulation | Control |
| --- | --- | --- |
| 1. Dry Matter (% w/w) | 23.1 | 20.5 |
| 2. Crude Protein (%)* | 13.4 | 14.7 |
| 3. Ash (%)* | 2.0 | 7.7 |
| 4. pH | 4.0 | 4.3 |
| 5. Ammonia - Nitrogen (%)* | 1.2 | 1.0 |
| 6. Residual Sugar (%)* | 3.6 | 1.9 |
| 7. Ethanol (%)* | 0.4 | 1.2 |
| 8. Acetic Acid (%)* | 4.4 | 4.7 |
| 9. Propionic Acid (%)* | 0.1 | 0.2 |
| 10. Total Volatile Fatty Acids (%)* | 4.5 | 4.8 |

*percentages are on a dry matter basis

EXAMPLE 3

Further farm trials compared alternative treatments with a hydrogen peroxide (35% w/w)/sodium benzoate (10% w/w) formulation on first cut of the season grass during Autumn 2000. Results after 4-5 months storage are shown in Table 3 for farms with grass of similar dry matter content and composition. The grass treated with hydrogen peroxide/sodium benzoate formulation demonstrates lower anaerobic and deleterious fermentation as shown by the much higher level of residual sugars and lower level of volatile fatty acids.

TABLE 3

| Analysis of stored grass | Hydrogen peroxide/ sodium benzoate formulation | Alternative chemical treatment |
| --- | --- | --- |
| Dry Matter (% w/w) | 35.5 | 33 |
| Crude Protein (%)* | 11 | 11.3 |
| pH | 4 | 4.3 |
| Residual Sugar (%)* | 6.5 | 1.8 |
| Lactic Acid (%)* | 7.5 | 4 |
| Volatile Fatty Acids (%)* | 2.8 | 3.5 |

*percentages are on a dry matter basis

EXAMPLE 4

The treatments shown in examples 1 and 2 were also evaluated for their aerobic stability i.e. under conditions representing opening of the clamp to use the forage as feed thus allowing air to enter the clamp. In this case comparisons were made with untreated forage as in examples 1 and 2 and also with forage treated with a typical acid product, formic acid (85% w/w) applied at 2.5 liters per tonne of grass. 750 g of the forages were stored in insulated boxes placed in a controlled environment at 20-22° C. A temperature probe was inserted into each box linked to a data logger to monitor temperature changes hourly over a 6 day period. Temperature increases are due to aerobic micro-organism activity and hence are an indication of aerobic stability of the forage as a function of the treatment applied. Results are shown in Table 4. The data shows improved aerobic stability of the hydrogen peroxide and peracetic acid formulations compared to an untreated control and compared to a typical acid product.

TABLE 4

| Forage Treatment | Temperature (° C.) Day 0 | Temperature (° C.) Day 6 | Temperature increase (° C.) |
|---|---|---|---|
| Untreated Control | 18.6 | 19.5 | +0.9 |
| Hydrogen Peroxide/Sodium Benzoate formulation as Example 1 | 18.0 | 18.0 | 0.0 |
| Peracetic Acid formulation as Example 2 | 18.2 | 18.7 | +0.5 |
| Formic Acid | 17.8 | 20.5 | +2.7 |

EXAMPLE 5

5 tonnes perennial rye grass was cut and treated by spray application during cutting for each of 4 treatments and a control. Treatments 1, 3 and 4 were applied as liquid compositions at 3 liters per tonne of fresh grass, whilst Treatment 2 was applied as a liquid composition at 2 liters per tonne of fresh grass. A control of untreated grass was used as a comparison. The 4×5 tonnes grass forages were stored in covered clamps under farm conditions for a period up to 12 weeks. Chemical and microbiological analyses of samples from the core of the clamps were conducted periodically during the storage period. Selected analyses are shown in Table 5.

Treatment 1 consisted of 19.5% w/w hydrogen peroxide and 15% w/w sodium benzoate
Treatment 2 consisted of 30% w/w hydrogen peroxide and 22.5% w/w sodium benzoate
Treatment 3 consisted of 15% w/w sodium benzoate
Treatment 4 consisted of 19.5% hydrogen peroxide

TABLE 5

| Analysis of stored grass after 12 weeks | Treatments | | | | |
|---|---|---|---|---|---|
|  | 1 | 2 | 3 | 4 | Control |
| 1. Dry Matter (% w/w) | 44.8 | 46.3 | 44.9 | 48 | 43.3 |
| 2. Crude protein (%)* | 12 | 13 | 13.6 | 11.5 | 12.9 |
| 3. Ash (%)* | 8.5 | 8.3 | 8.2 | 8.2 | 9.6 |
| 4. pH | 4.3 | 4.5 | 4.3 | 4.2 | 4.5 |
| 5. Ammonium - Nitrogen (%)* | 1.8 | 3.1 | 3 | 3 | 4 |
| 6. Sugars (%)* | 8.6 | 10.2 | 7.3 | 8.9 | 5.1 |
| 7. Temperature of forage in clamp (° C.) | 19.5 | 16.3 | 20 | 24.7 | 26 |

*percentages are on a dry matter basis

As shown in previous examples, analysis of sugar content (6) show that treatments with compositions containing both hydrogen peroxide and sodium benzoate (Treatments 1 & 2) show reduced fermentation of the grass compared to the control or to the compositions containing benzoate only (Treatment 3) with higher levels of unfermented residual sugars. The benefit of the combination treatments (Treatments 1 & 2) on fermentative activity is also clearly illustrated by the temperature (7) measured in the centre of the clamps during sampling. Treatments 1 and 2 show a lower temperature compared to the control or to either of the additives applied alone (Treatments 3 & 4).

The invention claimed is:

1. A process for the disinfection and/or preservation of harvested plant material which is animal feed selected from the group consisting of harvested grass, cereals, maize, wheat, legumes and mixtures thereof, the process comprising contacting the harvested plant material with a liquid composition comprising at least 0.5 wt. % of hydrogen peroxide and at least one preservative selected from the group consisting of benzoic acid, parahydroxybenzoic acid, their salts, and mixtures thereof.

2. The process according to claim 1 wherein the harvested plant material comprises harvested grass.

3. The process according to claim 1 wherein the preservative is selected from the group consisting of parahydroxybenzoic acid, parahydroxybenzoic acid salts, and mixtures thereof.

4. The process according to claim 1 wherein the liquid composition comprises from 5 to 60% wt of hydrogen peroxide and from 5 to 25% wt of the preservative.

5. The process according to claim 4 wherein the preservative is sodium benzoate.

6. The process according to claim 1 wherein the liquid composition is used in an amount of from 0.5 to 10 liters per ton of plant material.

7. The process according to claim 6 wherein the liquid composition is used in an amount of from 1 to 3 liters per ton of plant material.

8. The process according to claim 1 wherein the liquid composition has a pH of from 1 to 7.

9. The process according to claim 1 wherein the preservative is sodium benzoate.

10. The process according to claim 1 wherein the preservative is selected from the group consisting of benzoic acid, benzoic acid salts, and mixtures thereof.

11. The process according to claim 1 wherein the molar ratio of hydrogen peroxide to preservative is 0.2-5.

12. The process according to claim 1 wherein the harvested plant material comprises harvested grass, the liquid composition comprises from 5 to 60% wt of hydrogen peroxide and from 5 to 25 wt of the preservative, the liquid composition is used in an amount of 1 to 3 liters per ton of plant material, and the liquid composition has a pH of from 1 to 7.

13. The process according to claim 12 wherein the preservative is sodium benzoate.

14. The process according to claim 1, wherein the liquid composition comprises 18 to 35 wt of hydrogen peroxide.

15. The process according to claim 12, wherein the liquid composition comprises 18 to 35% wt of hydrogen peroxide.

* * * * *